United States Patent
Maeda et al.

(10) Patent No.: US 9,300,181 B2
(45) Date of Patent: Mar. 29, 2016

(54) CONVEYING APPARATUS

(71) Applicant: SINFONIA TECHNOLOGY CO., LTD., Tokyo (JP)

(72) Inventors: Minoru Maeda, Tokyo (JP); Yosuke Muraguchi, Tokyo (JP); Mamoru Kosaki, Tokyo (JP); Takashi Fujiwara, Tokyo (JP)

(73) Assignee: SINFONIA TECHNOLOGY CO., LTD., Tokyo (JP)

(*) Notice: Subject to any disclaimer, the term of this patent is extended or adjusted under 35 U.S.C. 154(b) by 273 days.

(21) Appl. No.: 14/135,335

(22) Filed: Dec. 19, 2013

(65) Prior Publication Data

US 2014/0183980 A1    Jul. 3, 2014

(30) Foreign Application Priority Data

Dec. 27, 2012 (JP) ................. 2012-285897

(51) Int. Cl.
*H02K 41/02* (2006.01)
*H02K 5/128* (2006.01)
*B65G 54/02* (2006.01)
*H02K 41/03* (2006.01)

(52) U.S. Cl.
CPC .............. *H02K 5/128* (2013.01); *B65G 54/02* (2013.01); *H02K 41/031* (2013.01); *H02K 41/03* (2013.01)

(58) Field of Classification Search
CPC ..... H02K 41/02; H02K 41/025; H02K 41/03; H02K 5/128; B66B 11/0407
USPC .......................................... 310/12.01–12.33
See application file for complete search history.

(56) References Cited

U.S. PATENT DOCUMENTS

| 8,177,048 B2* | 5/2012 | Sato | H01F 38/14 198/619 |
| 8,522,958 B2* | 9/2013 | Tobe | B65G 49/061 118/729 |
| 9,156,632 B2* | 10/2015 | Maeda | B65G 54/02 198/619 |
| 2006/0012251 A1* | 1/2006 | Miyata | H02K 41/031 310/12.18 |

FOREIGN PATENT DOCUMENTS

JP    2009-71955 A    4/2009

* cited by examiner

*Primary Examiner* — Hanh Nguyen
(74) *Attorney, Agent, or Firm* — Knobbe Martens Olson & Bear LLP (57) ABSTRACT

A conveying apparatus includes: a housing; a movable member; a linear motor; and a cover. The linear motor includes a primary magnetic pole and a secondary magnetic pole each having a facing surface that faces the other and that is a plane along the longitudinal direction of the housing. The cover allows the primary magnetic pole to be located in an atmospheric environment, and the secondary magnetic pole to be located in a vacuum environment or a reduced pressure environment by separating the primary magnetic pole and the secondary magnetic pole from each other. The primary magnetic pole and the secondary magnetic pole face each other so that a direction of a magnetic attraction force generated therebetween and acting on their facing surfaces is different from directions of forces acting, due to an atmospheric pressure outside the housing, on the wall of the housing on which the cover is provided.

7 Claims, 6 Drawing Sheets

FIG. 6B

CONVEYING APPARATUS

CROSS-REFERENCE TO RELATED APPLICATION

This application claims priority to Japanese Patent Application No. 2012-285897, the disclosure of which is incorporated herein by reference in its entirety.

BACKGROUND OF THE INVENTION

1. Field of the Invention

The present invention relates to a conveying apparatus driven by a linear motor.

2. Background Art

Figure 6A:
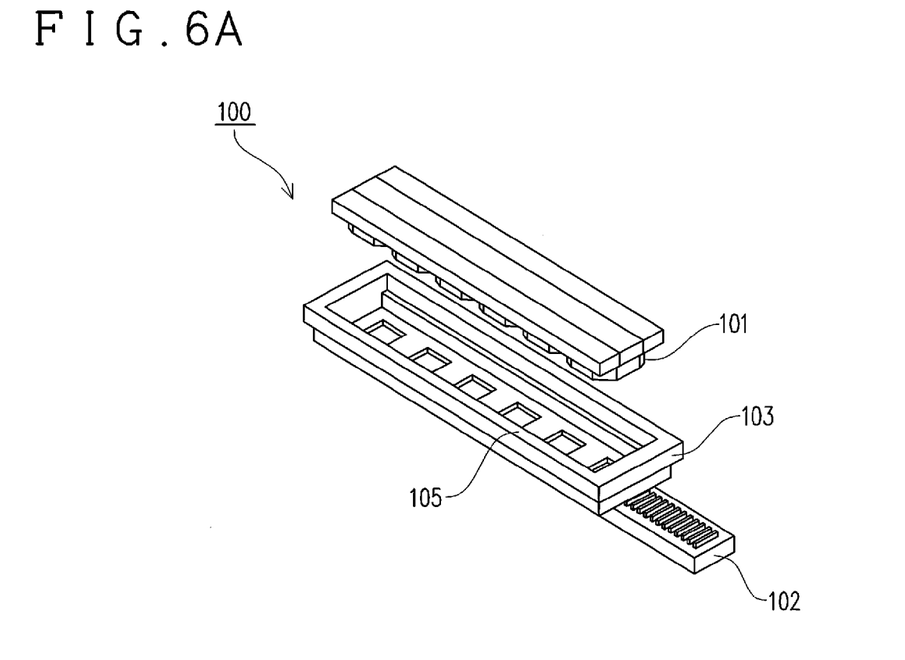
FIG. 6A is an exploded perspective view showing a linear motor according to JP 2009-71955 A.
Figure 6B:
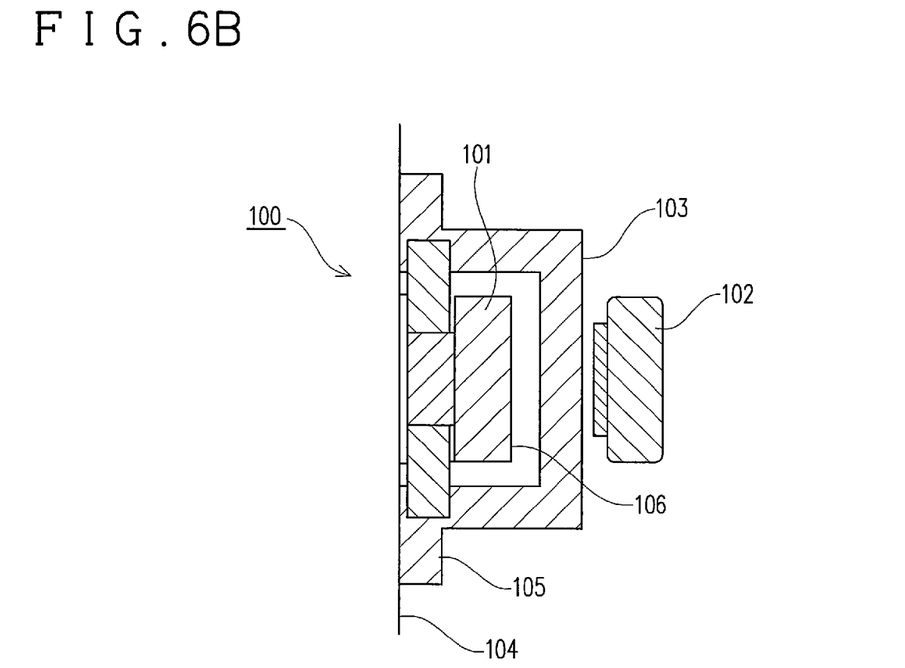
FIG. 6B is a schematic view, as viewed in a longitudinal cross section, showing the linear motor of JP 2009-71955 A.

A conveying apparatus driven by a linear motor is widely known. JP 2009-71955 A discloses an example of such a linear motor usable for the conveying apparatus. As shown in FIGS. 6A and 6B, a linear motor 100 includes primary magnetic poles 101 and secondary magnetic poles 102 arranged facing each other, and a cover 103 located between the magnetic poles 101 and 102. This cover 103 includes a mounting member 105 mounted on an inner wall 104 of a housing that constitutes the conveying apparatus, for example, as shown in FIG. 6B. The cover 103, for example, can allow the primary magnetic poles 101 on the fixed side to be located in the atmospheric environment, and the secondary magnetic poles 102 on the movable side to be located in a vacuum environment or a reduced pressure environment. This enables the conveying apparatus provided with the linear motor 100 to suitably convey an object in a vacuum environment or a reduced pressure environment, without releasing a gas through a plastic molded member around a coil in each primary magnetic pole 101 to the surroundings (vacuum environment), as in the case where the primary magnetic pole 101 is placed in vacuum environment.

In the linear motor 100 according to JP 2009-71955 A, a magnetic attraction force acts between the magnetic poles 101 and 102 facing each other. Further, a force to press the cover 103 toward the vacuum or reduced pressure side acts on the cover 103 due to the atmospheric pressure. The directions of the magnetic attraction force and a component of the force to press the cover 103 due to the atmospheric pressure which is directed toward the secondary magnetic poles 102 are coincident. Therefore, the magnetic attraction force and the component force may possibly be concentrated on a region of the inner wall 104 which is surrounded by the mounting member 105. Such concentration of forces may possibly cause a bending of the housing. As an influence of this bending, there may be cases where the distance (gap) between the magnetic poles 101 and 102 varies, thereby causing a change in thrust characteristics of the linear motor 100 (such as that the thrust becomes uneven), or each secondary magnetic pole 102 located on the movable side is prevented from moving smoothly relative to the primary magnetic pole 101 located on the fixed side by reasons such as application of a load to the bearing. As described above, it is a problem that the forces in the same direction are concentrated on the region of the inner wall 104 which is surrounded by the mounting member 105. Therefore, it is rendered necessary to increase the rigidity of the housing including the region of the inner wall 104 which is surrounded by the mounting member 105. The rigidity is increased, for example, by increasing the plate thickness of the part of the housing which includes the aforementioned region, or adding a reinforcement structure thereto, which therefore cause an increase in cost as a matter of course.

Figure 5A:
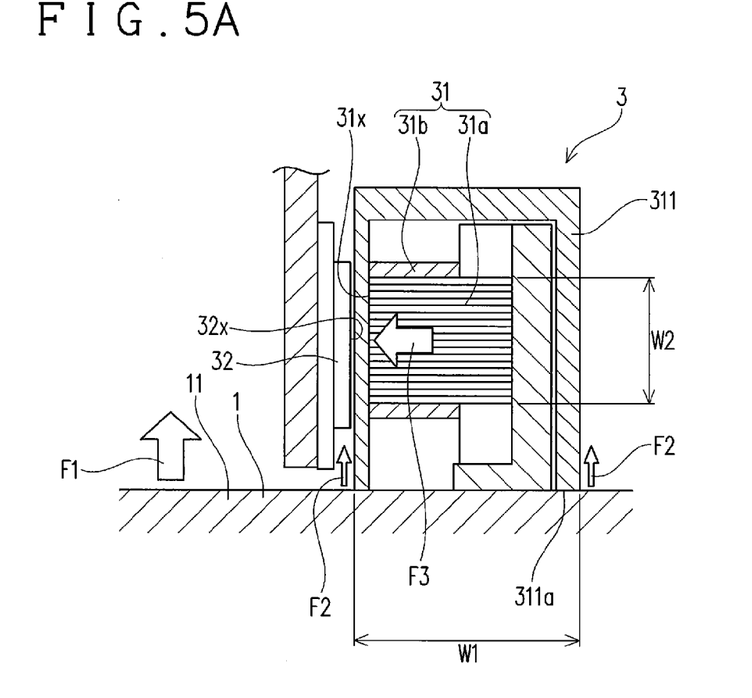
FIG. 5A is an explanatory diagram showing magnetic poles, a cover, and a housing of the present embodiment.
Figure 5B:
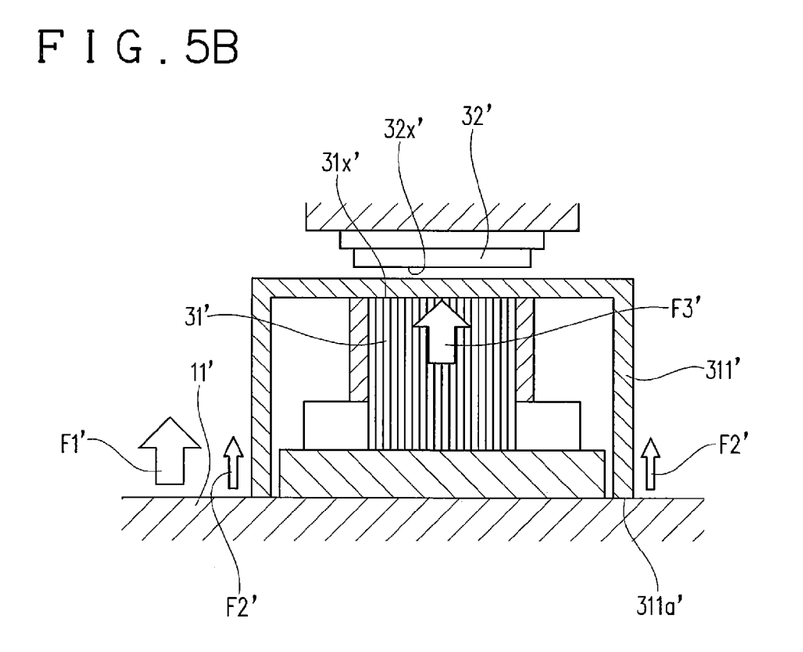
FIG. 5B is an explanatory diagram showing magnetic poles, a cover, and a housing of a comparative embodiment for explanation.

Particularly, in the linear motor 100 according to JP 2009-71955 A, a facing surface 106 of the primary magnetic pole 101 to the secondary magnetic pole 102 is located parallel to the inner wall 104 of the housing, as shown in FIG. 6B. Here, it is assumed that the primary magnetic pole 101 is formed by winding a coil around a core formed by stacking a plurality of plate bodies, for example, as shown in FIG. 5B, and the stacking direction of the plate bodies of the core is coincident with the width direction of the primary magnetic pole 101 (the left-right direction in FIG. 5B and the up-down direction in FIG. 6B). Under this assumption, if engineers change the design of the magnetic poles 101 and 102 in attempts to increase the thrust of the linear motor 100, it is necessary to increase the number of the plate bodies to be stacked in the core. That is, it is necessary to increase the width dimension of each of the magnetic poles 101 and 102. The surface area of the cover 103 is increased by this increment of the width dimension, and therefore the force due to the atmospheric pressure is also increased. In addition to this, the increase in thrust of the linear motor 100 leads to an increase in magnetic attraction force between the magnetic poles 101 and 102. For these reasons, the possibility of bending of the housing is more increased, which makes the aforementioned problem more significant.

SUMMARY OF THE INVENTION

It is therefore an object of the present invention to provide a conveying apparatus that is less likely to be disadvantageous in cost even if the inside of the housing is brought into a vacuum environment or a reduced pressure environment.

According to the present invention, there is provided a conveying apparatus including: a housing with a larger dimension in a longitudinal direction than in a width direction, the housing being provided with a wall and capable of maintaining its inside in a vacuum environment or a reduced pressure environment; a movable member located inside the housing, the movable member being movable along the longitudinal direction of the housing; a linear motor provided with a primary magnetic pole located on the housing side and a secondary magnetic pole located on the movable member side, the secondary magnetic pole being arranged facing the primary magnetic pole, the linear motor being capable of moving the movable member; and a cover capable of accommodating the primary magnetic pole, wherein the primary magnetic pole and the secondary magnetic pole each have a facing surface that faces the other and that is a plane along the longitudinal direction of the housing, the cover has a mounting member for being mounted on the wall, the cover allows the primary magnetic pole to be located in an atmospheric environment and the secondary magnetic pole to be located in a vacuum environment or a reduced pressure environment by separating the secondary magnetic pole and the primary magnetic pole accommodated in the cover from each other when being mounted on the wall, and the primary magnetic pole and the secondary magnetic pole face each other so that a direction of a magnetic attraction force generated by the primary magnetic pole and the secondary magnetic pole and acting on the facing surfaces is different from directions of forces acting, due to an atmospheric pressure outside the housing, on the wall on which the mounting member is mounted.

Further, a plurality of sets of the primary magnetic pole and the cover also may be present intermittently in the longitudinal direction of the housing.

Further, the direction of the magnetic attraction force generated by the primary magnetic pole and the secondary magnetic pole and acting on the facing surfaces can be orthogonal to the directions of the forces acting, due to the atmospheric pressure outside the housing, on the wall on which the mounting member is mounted.

Furthermore, the primary magnetic pole may be formed by winding a coil around a core formed by stacking a plurality of plate bodies, and the stacking direction of the plurality of plate bodies of the core may be parallel to the facing surface of the primary magnetic pole.

BRIEF DESCRIPTION OF THE DRAWINGS

The foregoing and other features of the present invention will become apparent from the following description and drawings of an illustrative embodiment of the invention in which.

DETAILED DESCRIPTION OF THE PREFERRED EMBODIMENT

Hereinafter, the present invention is described by way of an embodiment with reference to the drawings. As for the directions, the following description is given under the assumption that the direction coincident with the longitudinal direction of a housing 1 is the longitudinal direction, and that the direction orthogonal to the longitudinal direction is the width direction. Note that the up, down, left, and right directions and the vertical and horizontal directions are based on the state of the present embodiment. However, for example, an embodiment, in which the upper and lower sides are reversed from the state of the present embodiment (that is, an embodiment in which an object is hung and conveyed), can also be implemented. Therefore, the present invention is not limited to the form in the directions of the present embodiment. Further, as for the inward and outward directions, the description is given under the assumption that the direction directed toward the center in the width direction of the housing 1 is the inward direction, and that, in contrast, the direction away from the center in the width direction of the housing 1 is the outward direction.

Figure 1:
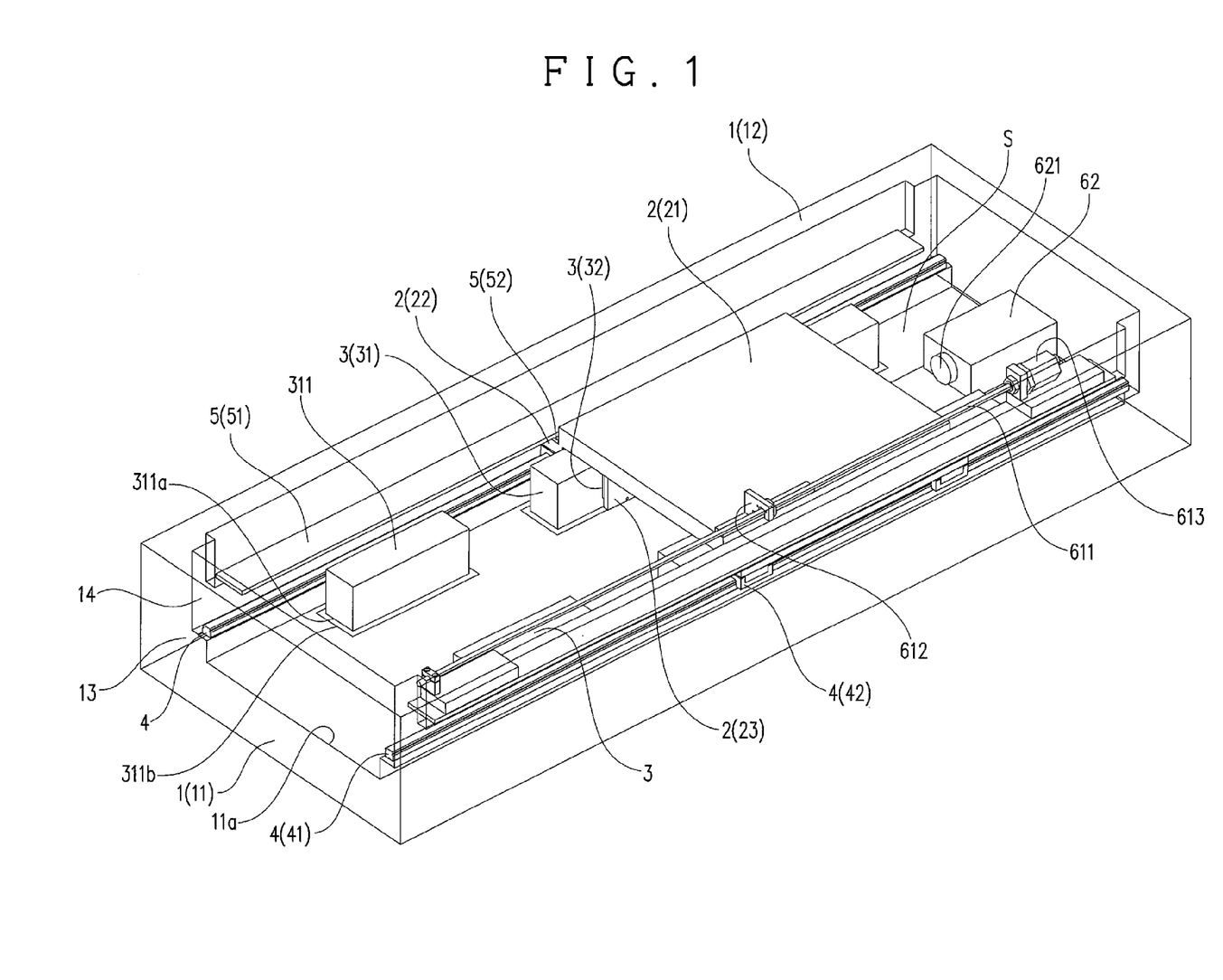
FIG. 1 is a perspective view showing a conveying apparatus according to one embodiment of the present invention.
Figure 2:
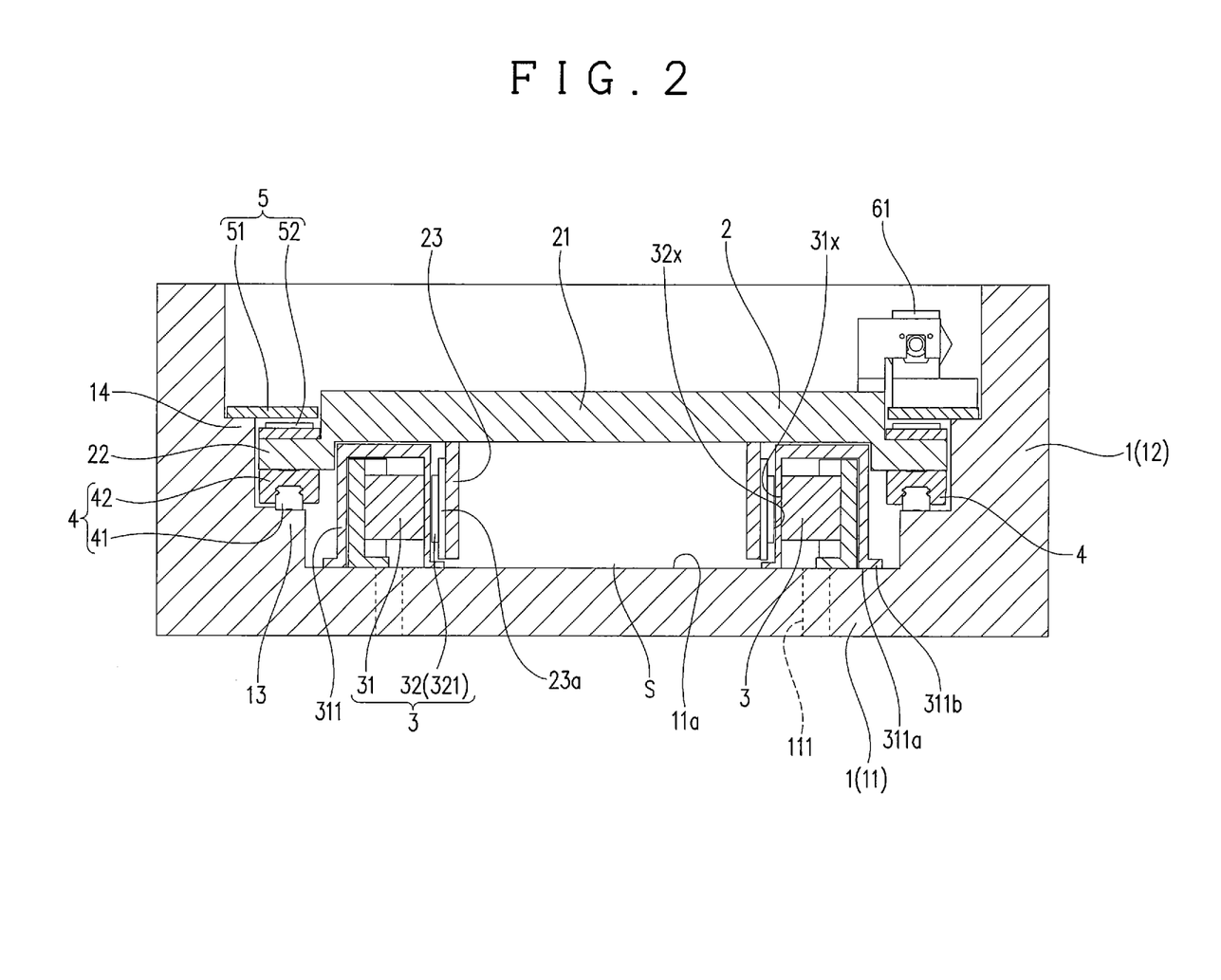
FIG. 2 is a longitudinal sectional view showing the conveying apparatus of the present embodiment.

As shown in FIG. 1 and FIG. 2, a conveying apparatus of the present embodiment includes the housing 1, a conveying table 2, linear motors 3, linear guides 4, and load reducing mechanisms 5. Each of the components is arranged to be line-symmetrical with respect to the center in the width direction of the housing 1.

The housing 1 functions as a fixed member and has a rectangular parallelepiped, box-like external shape. Note that the fixed member is composed of the housing 1, a part of each linear motor 3, a part of each linear guide 4, and a part of each load reducing mechanism 5. The housing 1 includes a bottom wall 11 located on the lower side thereof, sidewalls 12 located on the four sides thereof, and a top wall (not shown for the convenience of description) located on the upper side thereof. Primary magnetic poles 31, each of which constitutes the linear motor 3, are arranged on the upper surface (bottom wall upper surface) 11a of the bottom wall 11. As shown in FIG. 2, the bottom wall 11 of this embodiment has a uniform thickness, and the bottom wall upper surface 11a is horizontal (surface whose normal direction is vertical). Further, a groove for accommodating an o-ring that airtightly partitions the inside of the housing 1 into the inside and outside of a cover 311 is formed, though not shown, on the bottom wall upper surface 11a. Further, the sidewalls 12 are provided with steps which have upward facing surfaces extending in the longitudinal direction. Each step is composed of two parts, upper and lower, of a lower step 13 and an upper step 14. The lower step 13 functions as a support member for supporting the conveying table 2 from below. A guide rail 41, which constitutes the linear guide 4, is arranged on the upper surface of the lower step 13. Further, an attraction plate 51, which constitutes the load reducing mechanism 5, is arranged on the upper surface of the upper step 14.

The walls form a processing chamber which extends in the longitudinal direction and has a space surrounded by the walls. In the present embodiment, the bottom wall 11 and the sidewalls 12 are integrally formed of an aluminum alloy, and the walls are airtightly combined with each other. Therefore, the processing chamber can be brought into a vacuum state or a pressure-reduced state, for example, using a vacuum pump connected to the processing chamber. In this embodiment, a part, that is, a space surrounded by the cover 311, of the processing chamber in a vacuum environment or a reduced pressure environment is maintained in the atmospheric environment by locating the cover 311 within the processing chamber.

The conveying table 2 serves as a moving body of a movable member provided movably relative to the fixed member. The conveying table 2 is located at an upper part of the housing 1 (specifically above the bottom wall 11). Note that the movable member is composed of the conveying table 2, a part of the linear motor 3, a part of the linear guide 4, and a part of the load reducing mechanism 5, and is movable in the longitudinal direction. The conveying table 2 is movable (specifically, reciprocatingly) in the longitudinal direction within the housing 1 by being driven by the linear motor 3. The conveying table 2 includes a tray 21 located on the center side in the width direction and supported members 22 respectively located on both sides in the width direction of the conveying table 2. An object to be conveyed, such as an electronic component (for example, a silicon wafer), is placed on the upper surface of the tray 21 so as to be conveyed. Incidentally, the longitudinal dimension of the conveying table 2 is set according to the dimension of the object to be conveyed. This tray 21 may be provided with a device capable, for example, of moving, lifting, and rotating the object to be conveyed on the conveying table 2, such as a robot arm. Further, the supported members 22 are formed to be one step lower than the tray 21. The linear guide 4 is located below each supported member 22, and the load reducing mechanism 5 is located above the supported member 22.

The conveying table 2 includes, respectively at both ends in the width direction, secondary support brackets 23 for supporting secondary magnetic poles 32 which each constitute the linear motor 3. The secondary support brackets 23 are each formed in a plate shape extending downward from the lower surface of the tray 21. Further, the conveying table 2 includes, respectively at positions further outward in the width direction than the secondary support brackets 23, guide blocks 42 which each constitute the linear guide 4. Permanent magnets 52, which each constitute the load reducing mechanism 5, are mounted on the upper surface respectively at both ends in the width direction of the conveying table 2. Further, a part of a sensor for detecting the longitudinal position of the conveying table 2 is provided on the upper surface of the conveying table 2. In the present embodiment, this part is a magnet 612 of a magnetostrictive sensor 61. Note that, the magnetostrictive sensor 61 can detect the longitudinal position of the magnet 612 (that is, the longitudinal position of the conveying table 2) in such a manner that the magnet 612 applies torsional distortion to a magnetostrictive wire 611 that is provided in the housing 1 so as to extend in the longitudinal direction, and a detector 613 located at one end of the magnetostrictive wire 611 detects the torsional distortion, as shown in FIG. 1. The conveying table 2 is further provided thereon with a power supply mechanism (not shown) for supplying electric power to the device such as a robot arm, as required.

Next, the linear motor 3 is described. The linear motor 3 is configured between the fixed member and the movable member (so as to straddle between the fixed member and the movable member). The linear motor 3 of the present embodiment is a synchronous linear motor in which a permanent magnet is used on the secondary side. The linear motor 3 is composed of a row of the primary magnetic poles 31 linearly extending in the longitudinal direction, and the secondary magnetic pole 32 linearly extending in the longitudinal direction in parallel with the primary magnetic poles 31. That is, the linear motor 3 includes the primary magnetic poles 31 and the secondary magnetic pole 32. Further, the primary magnetic poles 31 and the secondary magnetic pole 32 are arranged facing each other so as to allow the movable member to move relative to the fixed member. That is, the primary magnetic poles 31 and the secondary magnetic pole 32 are arranged facing each other so that the propulsive force generated by the linear motor 3 acts to move the conveying table 2 in the longitudinal direction. As shown in FIG. 2, a facing surface 31x of the primary magnetic poles 31 and a facing surface 32x of the secondary magnetic pole 32, which surfaces face each other, are each a vertical plane (plane whose normal direction is horizontal) along the longitudinal direction of the housing 1. The facing surface 31x is an imaginary plane along the inner ends of the primary magnetic poles 31. That is, the facing surface 31x of this embodiment is a plane defined by inner ends of a plurality of sets of a core 31a and a coil 31b, as shown in FIG. 5A (one flat surface is not necessarily actually present). Likewise, the facing surface 32x is an imaginary plane along the outer ends of the secondary magnetic pole 32. That is, the facing surface 32x of this embodiment is a plane defined by the outer ends of a plurality of permanent magnets 321 (one flat surface is not necessarily actually present). In this way, the facing surfaces 31x and 32x are each orthogonal to the bottom wall upper surface 11a of the housing 1 which is horizontal.

The housing 1 is provided with the primary magnetic poles 31, and the conveying table 2 is provided with the secondary magnetic poles 32. Further, a pair of linear motors 3 are located so as to respectively match both ends in the width direction (left and right ends in FIG. 2) of the conveying table 2. That is, the conveying apparatus of the present embodiment includes two linear motors 3 per conveying table 2: one at one end and the other at the other end, in the width direction.

Each primary magnetic pole 31 includes the core 31a and the coil 31b wound around the core 31a, for example, as shown in FIG. 5A. Note that the primary magnetic pole 31 can also be configured to include only a coil without a core.

The core 31a is formed by stacking a plurality of plate bodies (steel plates) having a specific shape in the up-down (vertical) direction, as shown in FIG. 5A. That is, the steel plates constituting the core 31a each have a thickness direction coincident with the up-down (vertical) direction. The coil 31b is formed by winding a wire around the core 31a.

The combinations of the core 31a and the coil 31b are aligned in a row in the longitudinal direction, in the order respectively corresponding to three phases U, V, and W of AC, and each generate a magnetic flux mainly directed inward in the width direction when the coil 31b is energized.

Each set of the core 31a and the coil 31b are covered by the cover 311 formed of a nonmagnetic body, such as a stainless alloy (the cover 311 is described later in detail). When the conveying apparatus is used in a vacuum environment or a reduced pressure environment, the cover 311 functions as a partition wall between the vacuum (reduced pressure) region and the atmospheric region. As shown in FIG. 1, the primary magnetic poles 31 are intermittently arranged in the longitudinal direction. Further, as shown in FIG. 1 and FIG. 2, the primary magnetic poles 31 are arranged so as to face each other in the width direction. The covers 311 are arranged in the same manner.

Each secondary magnetic pole 32 is composed of a plurality of permanent magnets 321 fixed to the secondary support bracket 23 via a spacer 23a. The plurality of permanent magnets 321 are arranged with each two inwardly exposed magnetic poles having an N pole and an S pole adjacent to each other in the longitudinal direction. The secondary magnetic pole 32 faces the primary magnetic poles 31 at an inner side of the primary magnetic poles 31 so as to maintain a specific interval (gap) from the primary magnetic poles 31. That is, the secondary magnetic pole 32 has the permanent magnets 321 at positions facing the primary magnetic poles 31.

Here, some conventional conveying apparatuses are configured such that one secondary magnetic pole is held between primary magnetic poles from both sides in the width direction of the secondary magnetic pole. The secondary magnetic pole of this conveying apparatus is required to generate a magnetic flux toward each of both directions, such as the left direction and the right direction, in the width direction. For this reason, when the secondary magnetic pole is formed by using permanent magnets, it is necessary that the same magnetic poles be bonded to each other. However, this bonding work needs to be performed under the action of a magnetic repulsion force, and hence the working efficiency is not high.

In contrast, each secondary magnetic pole 32 of the present embodiment can be manufactured only by arranging side by side the permanent magnets 321 along the longitudinal direction. Therefore, it is not necessary, as described above, to perform the work of bonding the same magnetic poles of the permanent magnets to each other under the action of a magnetic repulsion force. Thus, the working efficiency in producing the secondary magnetic pole 32 is high.

A single unit of the linear motor 3 is composed of the primary magnetic poles 31 and the secondary magnetic pole 32. A pair of linear motors 3 are separately located in the width direction. Thereby, a space S can be secured at the center of the housing 1 below the conveying table 2, as shown in FIG. 2. In the present embodiment, a sensor (laser sensor 62) for detecting the longitudinal position of the conveying table 2 is provided, as shown in FIG. 1, in the thus secured space S. In order to reflect laser light emitted from a laser emitter 621 of the laser sensor 62 so that the reflected light returns to the laser sensor 62, a reflection mirror (not shown) is provided on the lower surface of the tray 21 of the conveying table 2. The reflection mirror is provided so as to have a reflection surface that faces the laser emitter 621. Note that the laser sensor 62 is a sensor different from the magnetostrictive sensor 61. In the present embodiment, the longitudinal position of the conveying table 2 is mainly detected by the laser sensor 62, and the magnetostrictive sensor 61 is used as a backup sensor. The space S can be secured below the conveying table 2 in this way, and hence the flexibility in arranging various components of the conveying apparatus can be increased.

Further, in a single unit of the linear motor 3, the primary magnetic poles 31 and the secondary magnetic pole 32 face each other on one side on which the surfaces of the magnetic poles 31 and 32 face each other. Therefore, it is easy to perform the work of setting, to an appropriate value, the interval (gap) between each primary magnetic pole 31 and the secondary magnetic pole 32, as compared with a conventional configuration in which the secondary magnetic pole is located on each of both sides in the width direction of the primary magnetic pole.

Further, the driving force for moving the conveying table 2 is generated at both ends in the width direction of the conveying table 2, and hence the generation source of the force to bend the conveying table 2 is distributed without being concentrated. Thereby, it is possible to reduce the bending of the conveying table 2.

Next, the cover 311 is described in detail. The cover 311 has a hollow, substantially rectangular parallelepiped shape, and its bottom surface is fully open. The cover 311 of this embodiment has a flange 311b, formed at a bottom surface 311a serving as a mounting member, extending outwardly of the cover 311. The flange 311b is screw-fastened to the bottom wall upper surface 11a of the housing 1 (screws are not shown), so that the cover 311 is fixed to the housing 1. With such a state, the cover 311 projects upward from the bottom wall upper surface 11a. The cover 311 accommodates each primary magnetic pole 31 thereinside. At the time of screwing, an airtight member such as an o-ring is interposed between the flange 311b and the bottom wall upper surface 11a, thereby airtightly separating the inside and outside of the cover 311 from each other. In the part of the bottom wall 11 which is covered by the cover 311, a through hole 111 as shown by dashed lines in FIG. 2 is formed. The inside of the cover 311 is in communication with the outside of the housing 1 through the through hole 111. However, the aforementioned communication is not indispensable for the present invention. For example, the inside of the cover 311 may be airtightly separated from the outside of the housing 1 constantly or temporarily, though the inside of the cover 311 is in the atmospheric environment. Further, a power supply cable for the primary magnetic pole 31 is passed through the through hole 111. In this way, the inside of the cover 311 is brought into the atmospheric environment, while the outside of the cover 311 (that is, the region surrounding the cover 311 in the processing chamber of the housing 1) is brought into a vacuum environment or a reduced pressure environment, in this embodiment. Note that, such screw-fastening using the flange 311b is merely an example, and the cover 311 can be fixed to the housing 1 by various means.

The bottom surface 311a that is the mounting member of the cover 311 in this embodiment is located on the bottom wall upper surface 11a of the housing 1. That is, the bottom surface 311a is located on the horizontal plane. As has been mentioned above, the respective facing surfaces 31x and 32x of the magnetic poles 31 and 32 are each a vertical plane along the longitudinal direction of the housing 1. Accordingly, the extended direction of the plane of the bottom wall 11 (a part of the bottom wall upper surface 11a) on which the bottom surface 311a is located is orthogonal to the extended direction of each of the facing surfaces 31x and 32x. Further, the normal direction of the bottom wall upper surface 11a is orthogonal to the normal direction of each of the facing surfaces 31x and 32x.

Thus, the bottom wall upper surface 11a in the region surrounded by the bottom surface 311a that is the mounting member is orthogonal to each of the facing surfaces 31x and 32x. Therefore, the housing 1, the primary magnetic pole 31, and the cover 311 have a relationship of forces shown by arrows in FIG. 5A. That is, a magnetic attraction force F3 of the primary magnetic pole 31 on the secondary magnetic pole 32 (force acting on the part of the bottom wall 11 that is immediately below the primary magnetic pole 31) is orthogonal to a force F1 (force acting on the entire bottom wall 11) to lift the bottom wall 11 due to the atmospheric pressure that is the ambient pressure of the outside (surroundings) of the housing 1 and an upward component force F2 of the force with which the cover 311 is pressed due to the atmospheric pressure (force acting on the connection point between the housing 1 and the bottom surface 311a). Accordingly, among the forces acting on the region of the housing 1 which is surrounded by the bottom surface 311a, only the force F1 and the force F2 act in the same direction, that is, the forces F1 and F2 act in a different direction from the force F3.

On the other hand, as shown in FIG. 5B as a comparative embodiment, when a configuration in which a bottom surface 311a' serving as a mounting member of a cover 311' is located parallel to facing surfaces 31x' and 32x' is taken as an example, a relationship of forces shown by arrows occurs. That is, a force F1' to lift a bottom wall 11' due to the atmospheric pressure, an upward component force F2' of the force with which the cover 311' is pressed due to the atmospheric pressure, and a magnetic attraction force F3' of the primary magnetic pole 31' on the secondary magnetic pole 32' all act in the same direction. Therefore, the directions of all the forces F1', F2', and F3' act on the region of the housing 1' which is surrounded by the bottom surface 311a' are coincident with one another.

Particularly, in a thin elongated housing, deformation (bending) at the center in the longitudinal direction of the bottom wall 11' due to the force F1' is larger. Therefore, there may be cases where variation in distance (gap) between magnetic poles 31' and 32' causes a change in thrust characteristics of the linear motor (such as that the thrust becomes uneven), or the secondary magnetic pole 32' located on the movable side is prevented from smoothly moving relative to the primary magnetic pole 31' located on the fixed side, for example, due to a load acting on the bearing. Thus, malfunctions may possibly occur.

Accordingly, when it is assumed that the force F1 and the force F1' are equal, the force F2 and the force F2' are equal, and the force F3 and the force F3' are equal, the forces acting on the bottom surface 311a (311a') in the same direction can be suppressed from concentrating on the region of the housing 1 which is surrounded by the bottom surface 311a, more in the configuration of this embodiment shown in FIG. 5A than in the configuration of the comparative embodiment shown in FIG. 5B. Therefore, design with reduced differences in the forces, and reduced strength of the housing 1 (particularly, in the portion corresponding to the region surrounded by the bottom surface 311a) is possible. That is, it is less necessary to increase the rigidity of the housing 1, which is advantageous in cost. Further, the malfunctions as mentioned above are less likely to occur in the housing 1 that is large in the longitudinal direction.

Since the concentration of the forces is suppressed, the distance (gap) between the magnetic poles 31 and 32 is made difficult to vary. Therefore, the thrust characteristics of the linear motor are less likely to change, and the conveying table 2 can be smoothly moved.

Further, even in the case where engineers change the design to increase the thrust of the linear motor, this embodiment can be applied to such a design change by increasing the dimension W2 in the up-down direction that is the stacking direction of the core 31a as shown in FIG. 5A. Therefore, the cover 311 also can be applied thereto by increasing the height dimension corresponding to the increased dimension of the core 31a without increasing the width dimension W1.

Therefore, for example, as shown in FIG. 5B (and FIGS. 6A and 6B), it is relatively less necessary to increase the rigidity of the housing 1, as compared to the configuration in which the bottom surface 311a' that is the mounting member is located parallel to the facing surfaces 31x' and 32x' (where it is necessary to increase the dimension in the width direction of the core in order to increase the thrust). Accordingly, the need to increase the plate thickness of the housing 1 or add a reinforcement structure for increasing the rigidity is eliminated. That is, it is less necessary to increase the rigidity of the housing 1, which is advantageous in cost also in the above point.

In addition to the above, the covers 311 are intermittently arranged in the longitudinal direction, as shown in FIG. 1, in this embodiment. Therefore, it is possible to relatively suppress the bending, which is caused by the force with which the cover 311 pulls the bottom wall upper surface 11a of the housing 1 due to the atmospheric pressure (force F2 shown in FIG. 5A), of the bottom wall 11 of the housing 1 more, as compared to the configuration in which the covers 311 are continuously arranged in the longitudinal direction. Accordingly, it is less necessary to increase the rigidity of the housing 1, which is advantageous in cost, also in this aspect.

As shown in FIG. 2, the linear guide 4 is configured such that the guide block 42 fixed to the conveying table 2 as a guided member straddles the guide rail 41 as a guide member extending in the longitudinal direction on the housing 1 side. With this configuration, the moving direction of the conveying table 2 is regulated.

Ball bearings (not shown) are located between the guide rail 41 and the guide block 42, so that the guide block 42 can be moved along the guide rail 41 with small resistance. The linear guide 4 is located more outwardly in the width direction than the linear motor 3.

The linear motor 3 and the linear guide 4 can be arranged closer to each other as compared to a conventional configuration in which the linear motor 3 is provided at the center of the housing 1. This can reduce the displacement of the conveying table 2 caused by the propulsive force of the linear motor 3. Therefore, it is possible to reduce the load acting on the linear guide 4 (especially, on the ball bearings). Particularly, in order to prevent contamination due to scattering of lubricating oil, oilless bearings that are less durable than bearings using lubricating oil are used in the conveying apparatus when used in a vacuum environment or a reduced pressure environment. Therefore, such load reduction can extend the life of the linear guide 4.

The load reducing mechanism 5 includes the attraction plate 51 located on the housing 1 side and having a magnetic body, and the permanent magnet 52 located on the conveying table 2 side. The attraction plate 51 is located above the permanent magnet 52. The load reducing mechanism 5 is located immediately above the linear guide 4 (note that "immediately above" in this specification conceptually includes not only a vertically above position but also a position in the vicinity of the vertically above position). This configuration allows the conveying table 2 to be urged upward (directly upward) due to the magnetic attraction force of the permanent magnet 52 on the attraction plate 51. The weight load acting on the linear guide 4 is reduced by the amount corresponding to the force urging the conveying table 2. Thus, it is possible to reduce the load acting on the ball bearings of the linear guide 4 and hence to extend the life of the linear guide 4. Further, use of a permanent magnet can simplify the configuration of the load reducing mechanism 5.

In the above, the present invention has been described by way of an embodiment. However, the present invention is not limited to the above-described embodiment, and various modifications are possible without departing from the gist of the present invention.

For example, the processing chamber of the housing 1 may also be maintained in an inert gas environment with reduced pressure.

Further, in the aforementioned embodiment, the normal direction (up-down direction) of the plane of the bottom wall 11 (part of the bottom wall upper surface 11a) on which the bottom surface 311a that is the mounting member of the cover 311 is located is orthogonal to the normal direction (horizontal direction) of each of the facing surfaces 31x and 32x of the magnetic poles 31 and 32, which however is not restrictive. In the region of the housing 1 which is surrounded by the bottom surface 311a, the normal direction of the plane defined by the region surrounded by the bottom surface 311a and the normal direction of each of the facing surfaces 31x and 32x need only to intersect each other so that the directions of the forces due to the atmospheric pressure (these forces are composed of a force with which the housing 1 is directly bent due to the atmospheric pressure and a force with which the bottom surface 311a pulls the housing 1 due to the atmospheric pressure pressing the cover 311) are different from (not coincident with) the direction of the magnetic attraction force. Further, the "plane defined by the region surrounded by the bottom surface 311a", though being an existing surface (the bottom wall upper surface 11a) in the aforementioned embodiment, may be an imaginary plane including a part of the bottom surface 311a which extends along the longitudinal direction, for example, in the case where the bottom wall upper surface 11a is curved. Further, for example, in the case where the bottom wall upper surface 11a is an uneven surface, it may be a plane defined on the basis of an average position where the bottom surface 311a exists. That is, the plane is defined on the basis of the region surrounded by the bottom surface 311a.

Figure 3:
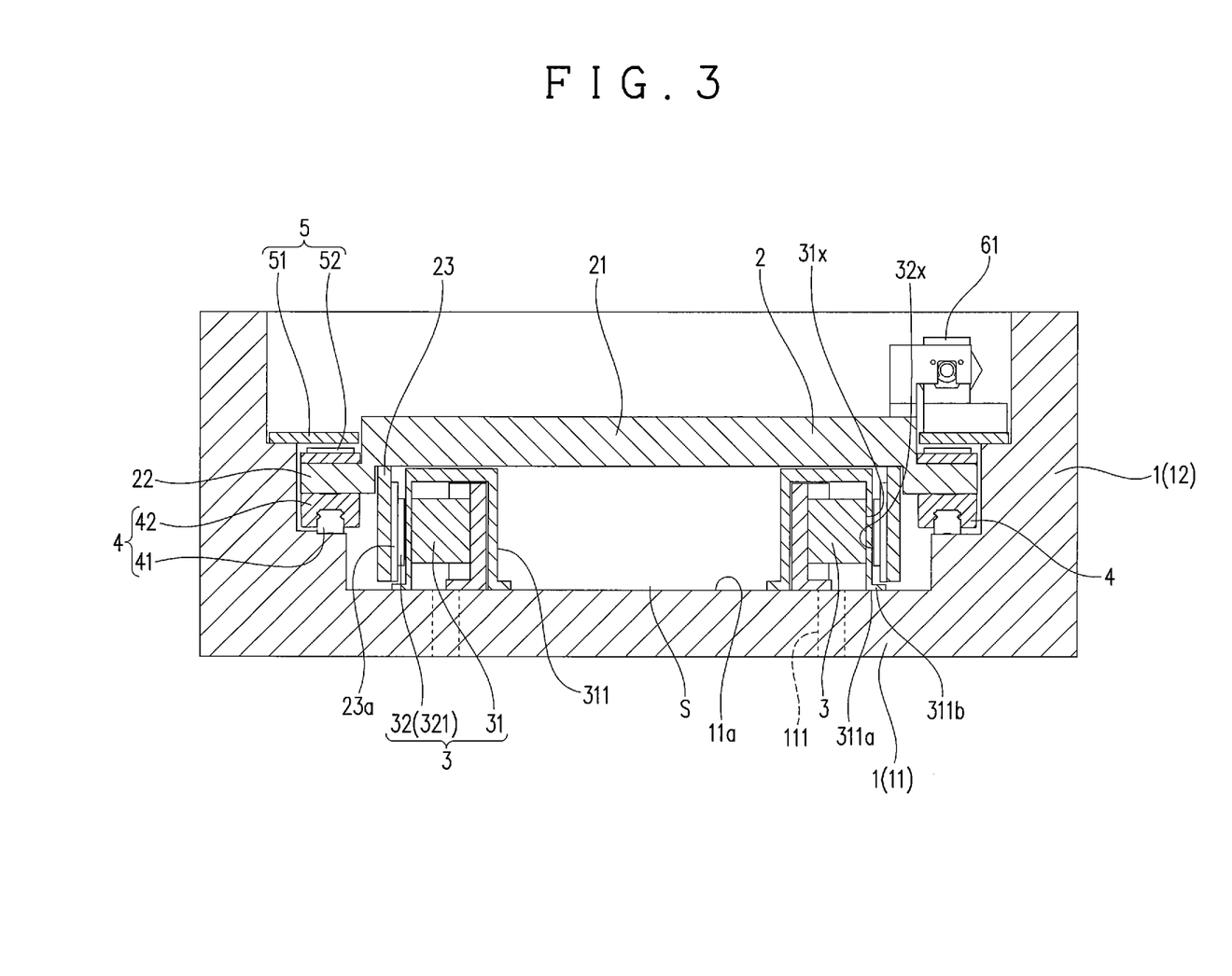
FIG. 3 is a longitudinal sectional view showing another embodiment of the present invention.
Figure 4:
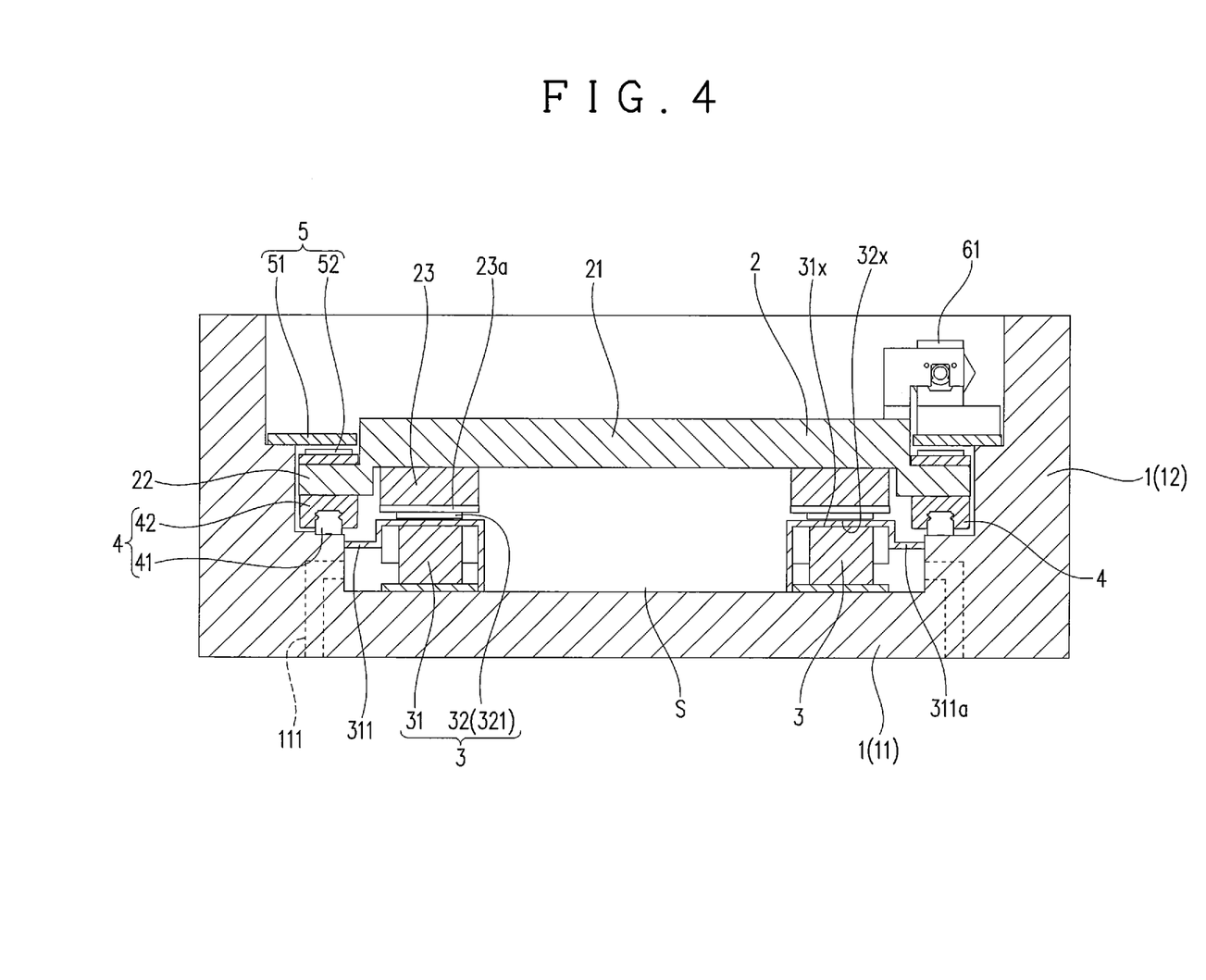
FIG. 4 is a longitudinal sectional view showing still another embodiment of the present invention.

Further, in the present embodiment, the primary magnetic pole 31 is located outwardly in the width direction, and the secondary magnetic pole 32 is located inwardly in the width direction. However, as shown in FIG. 3, the primary magnetic pole 31 may be located inwardly, and the secondary magnetic pole 32 may be located outwardly. Further, in the present embodiment, the primary magnetic pole 31 and the secondary magnetic pole 32 are arranged side by side in the horizontal direction (left-right direction). However, as shown in FIG. 4, the primary magnetic pole 31 and the secondary magnetic pole 32 may be arranged side by side in the vertical direction. However, in this case of FIG. 4, since the magnetic poles 31 and 32 are located so as to allow the normal direction of the plane surrounded by the bottom surface 311a that is the mounting member of the cover 311 to intersect the normal direction of each of the facing surfaces 31*x* and 32*x*, the cover 311 is formed so that the bottom surface 311*a* is located on the internal surface of the corresponding sidewall 12, for example, as illustrated.

Further, the primary magnetic poles 31 of the present embodiment are intermittently arranged in the longitudinal direction but may also be continuously arranged in the longitudinal direction. Further, the primary magnetic poles 31 of the present embodiment are arranged to be symmetrical with respect to the center line in the width direction but may also be arranged to be shifted to one side in the width direction. However, when the conveying apparatus is used in a vacuum environment or a reduced pressure environment, the symmetrical arrangement is desirable in order to suppress uneven deformation of each component under reduced pressure.

Further, the secondary magnetic pole 32 may also be provided with a core and a coil wound around the core, in the same manner as the primary magnetic pole 31 of this embodiment.

Further, the cover 311 has a substantially rectangular parallelepiped shape in this embodiment, which however is not restrictive. The cover 311 may have a trapezoid or semicircular shape, for example, in cross section. Further, the housing 1 may be configured to have a part that serves also as a part or all of the cover 311.

Further, the load reducing mechanism 5 may be located immediately below the linear guide 4 (note that the term "immediately below" in this specification conceptually includes not only a vertically below position but also a position in the vicinity of the vertically below position). Further, for example, the same magnetic poles of permanent magnets may be faced to each other so that the conveying table 2 is urged upward due to the magnetic repulsion force. Further, electromagnets may also be used instead of the permanent magnets.

Further, the longitudinal direction in the present embodiment is a linear direction (direction along a straight line), which however is not restrictive. The longitudinal direction may be a direction along a curved line when the housing 1 is formed to have a curved shape or an annular shape.

The above description is summarized as follows. The conveying apparatus according to the present embodiment includes: the housing 1 with a larger dimension in the longitudinal direction than in the width direction, the housing having a wall (bottom wall 11, sidewalls 12) and being capable of maintaining its inside in a vacuum environment or a reduced pressure environment; a movable member located inside the housing 1, the movable member being movable along the longitudinal direction of the housing 1; a linear motor 3 provided with a primary magnetic pole 31 located on the housing side and a secondary magnetic pole 32 located on the movable member side, the secondary magnetic pole 32 being arranged facing the primary magnetic pole 31, the linear motor being capable of moving the movable member; and a cover 311 capable of accommodating the primary magnetic pole 31, wherein the primary magnetic pole 31 and the secondary magnetic pole 32 each have a facing surface that faces the other and that is a plane along the longitudinal direction of the housing 1, the cover 311 has a mounting member (bottom surface) 311*a* for being mounted on the wall (bottom wall 11), the cover 311 allows the primary magnetic pole 31 to be located in an atmospheric environment and the secondary magnetic pole 32 to be located in a vacuum environment or a reduced pressure environment by separating the secondary magnetic pole 32 and the primary magnetic pole 31 accommodated in the cover 311 from each other when being mounted on the wall (bottom wall 11), and the primary magnetic pole 31 and the secondary magnetic pole 32 face each other so that a direction of a magnetic attraction force F3 generated by the primary magnetic pole 31 and the secondary magnetic pole 32 and acting on the facing surfaces is different from directions of forces F1 and F2 acting, due to the atmospheric pressure outside the housing, on the wall (bottom wall 11) on which the mounting member (bottom surface) 311*a* is mounted.

According to this configuration, the primary magnetic pole 31 and the secondary magnetic pole 32 face each other so that the direction of the magnetic attraction force F3 generated by the primary magnetic pole 31 and the secondary magnetic pole 32 and acting on the facing surfaces is different from the directions of the forces F1 and F2 acting, due to the atmospheric pressure outside the housing, on the wall (bottom wall 11) on which the mounting member (bottom surface) 311*a* is mounted. Therefore, the concentration of the forces in the same direction on a part of the wall (bottom wall 11) in the region surrounded by the mounting member (bottom surface) 311*a* can be suppressed. Accordingly, it is possible to reduce the necessity to increase the rigidity of the housing 1.

Further, a plurality of sets of the primary magnetic pole 31 and the cover 311 may be intermittently present in the longitudinal direction of the housing 1.

According to this configuration, the bending of the housing 1 caused by the force F2 with which the cover 311 pulls the housing 1 due to the atmospheric pressure can be suppressed more, as compared to the case where the covers 311 are continuously provided in the longitudinal direction. Therefore, it is possible to reduce the necessity to increase the rigidity of the housing 1.

Further, the direction of the magnetic attraction force F3 generated by the primary magnetic pole 31 and the secondary magnetic pole 32 and acting on the facing surfaces can be made orthogonal to the directions of the forces F1 and F2 acting, due to the atmospheric pressure outside the housing, on the wall (the bottom wall 11) on which the mounting member (bottom surface) 311*a* is mounted.

According to this configuration, the direction of the magnetic attraction force F3 generated by the primary magnetic pole 31 and the secondary magnetic pole 32 and acting on the facing surfaces is orthogonal to the directions of the forces F1 and F2 acting, due to the atmospheric pressure outside the housing, on the wall (bottom wall 11) on which the mounting member (bottom surface) 311*a* is mounted. Therefore, the concentration of the forces in the same direction on a part of the wall (bottom wall 11) in the region surrounded by the mounting member (bottom surface) 311*a* can be suppressed. Accordingly, it is possible to reduce the necessity to increase the rigidity of the housing 1.

Furthermore, the primary magnetic pole 31 can be formed by winding the coil 31*b* around the core 31*a* formed by stacking a plurality of plate bodies, and the stacking direction of the plurality of plate bodies of the core can be parallel to the facing surface of the primary magnetic pole 31.

According to this configuration, the stacking direction of the plurality of plate bodies of the core 31*a* is parallel to the direction in which the facing surface of the primary magnetic pole 31 extends. Therefore, even in the case where the number of the plurality of plate bodies to be stacked in the core 31*a* is increased in order to increase the thrust of the linear motor 3, there is no need to increase the region surrounded by the mounting member (bottom surface) 311*a*. Accordingly, it is possible to reduce the necessity to increase the rigidity of the housing 1.

The present invention can suppress the concentration of forces on a part of the wall (bottom wall 11) in the region surrounded by the mounting member (bottom surface) 311a in the same direction. Therefore, it is possible to reduce the necessity to increase the rigidity of the housing 1. Thus, it is possible to provide a conveying apparatus that is less likely to be disadvantageous in cost even if the inside of the housing is brought into a vacuum environment or a reduced pressure environment.

What is claimed is:

1. A conveying apparatus comprising:
   a housing with a larger dimension in a longitudinal direction than in a width direction, the housing being provided with a wall and capable of maintaining its inside in a vacuum environment or a reduced pressure environment;
   a movable member located inside the housing, the movable member being movable along the longitudinal direction of the housing;
   a linear motor provided with a primary magnetic pole located on the housing side and a secondary magnetic pole located on the movable member side, the secondary magnetic pole being arranged facing the primary magnetic pole, the linear motor being capable of moving the movable member; and
   a cover capable of accommodating the primary magnetic pole, wherein
   the primary magnetic pole and the secondary magnetic pole each have a facing surface that faces the other and that is a plane along the longitudinal direction of the housing,
   the cover has a mounting member for being mounted on the wall,
   the cover allows the primary magnetic pole to be located in an atmospheric environment and the secondary magnetic pole to be located in a vacuum environment or a reduced pressure environment by separating the secondary magnetic pole and the primary magnetic pole accommodated in the cover from each other when being mounted on the wall, and
   the primary magnetic pole and the secondary magnetic pole face each other so that a direction of a magnetic attraction force generated by the primary magnetic pole and the secondary magnetic pole and acting on the facing surfaces is different from directions of forces acting, due to an atmospheric pressure outside the housing, on the wall on which the mounting member is mounted.

2. The conveying apparatus according to claim 1, wherein a plurality of sets of the primary magnetic pole and the cover are intermittently present in the longitudinal direction of the housing.

3. The conveying apparatus according to claim 2, wherein the direction of the magnetic attraction force generated by the primary magnetic pole and the secondary magnetic pole and acting on the facing surfaces is orthogonal to the directions of forces acting, due to the atmospheric pressure outside the housing, on the wall on which the mounting member is mounted.

4. The conveying apparatus according to claim 2, wherein the primary magnetic pole is formed by winding a coil around a core formed by stacking a plurality of plate bodies, and
the stacking direction of the plurality of plate bodies of the core is parallel to the facing surface of the primary magnetic pole.

5. The conveying apparatus according to claim 1, wherein the direction of the magnetic attraction force generated by the primary magnetic pole and the secondary magnetic pole and acting on the facing surfaces is orthogonal to the directions of forces acting, due to the atmospheric pressure outside the housing, on the wall on which the mounting member is mounted.

6. The conveying apparatus according to claim 5, wherein the primary magnetic pole is formed by winding a coil around a core formed by stacking a plurality of plate bodies, and
the stacking direction of the plurality of plate bodies of the core is parallel to the facing surface of the primary magnetic pole.

7. The conveying apparatus according to claim 1, wherein the primary magnetic pole is formed by winding a coil around a core formed by stacking a plurality of plate bodies, and
the stacking direction of the plurality of plate bodies of the core is parallel to the facing surface of the primary magnetic pole.

* * * * *